United States Patent [19]

Jacobs et al.

[11] Patent Number: 5,018,918

[45] Date of Patent: May 28, 1991

[54] LOAD RESTRAINT BAR FOR CARGO VEHICLES

[76] Inventors: H. Montgomery Jacobs, 32075 W. 95th St., Desoto, Kans. 55018; William D. Forrester, 1529 W. Cedar, Olathe, Kans. 66061

[21] Appl. No.: 380,606

[22] Filed: Jul. 17, 1989

[51] Int. Cl.$^5$ .............................................. B61D 45/00
[52] U.S. Cl. ................................... 410/145; 410/143; 211/105.1; 211/123; 403/100; 403/72; 403/104
[58] Field of Search ....................... 410/143, 145, 151; 248/351; 211/105.1, 105.3, 123; 182/128, 164; 405/272, 282; 403/72, 100, 104

[56] References Cited

U.S. PATENT DOCUMENTS

| 1,629,718 | 5/1927 | Lockard | 182/128 |
| 3,090,600 | 5/1963 | Smith | 410/151 |
| 4,818,135 | 4/1989 | Desjardins | 403/104 |
| 4,834,599 | 5/1989 | Gordon | 410/151 |

FOREIGN PATENT DOCUMENTS

| 123719 | 3/1947 | Australia | 248/351 |
| 923245 | 2/1955 | Fed. Rep. of Germany | 248/351 |
| 159063 | 6/1957 | Sweden | 248/351 |

Primary Examiner—Robert J. Spar
Assistant Examiner—Craig Slavin
Attorney, Agent, or Firm—Kokjer, Kircher, Bradley, Wharton, Bowman & Johnson

[57] ABSTRACT

A load bar for extension between opposite side walls of a cargo vehicle to restrain the cargo. The bar includes a pair of main tubes pivoted end to end at a toggle joint. An extension tube has a telescopic fit in one of the main tubes to provide length adjustment over a wide range. A clamp may be tightened to rigidly clamp the extension tube in place. The toggle joint may be covered and locked in its straight condition by a sleeve which fits closely yet slidably on the main tubes of the load bar.

16 Claims, 2 Drawing Sheets

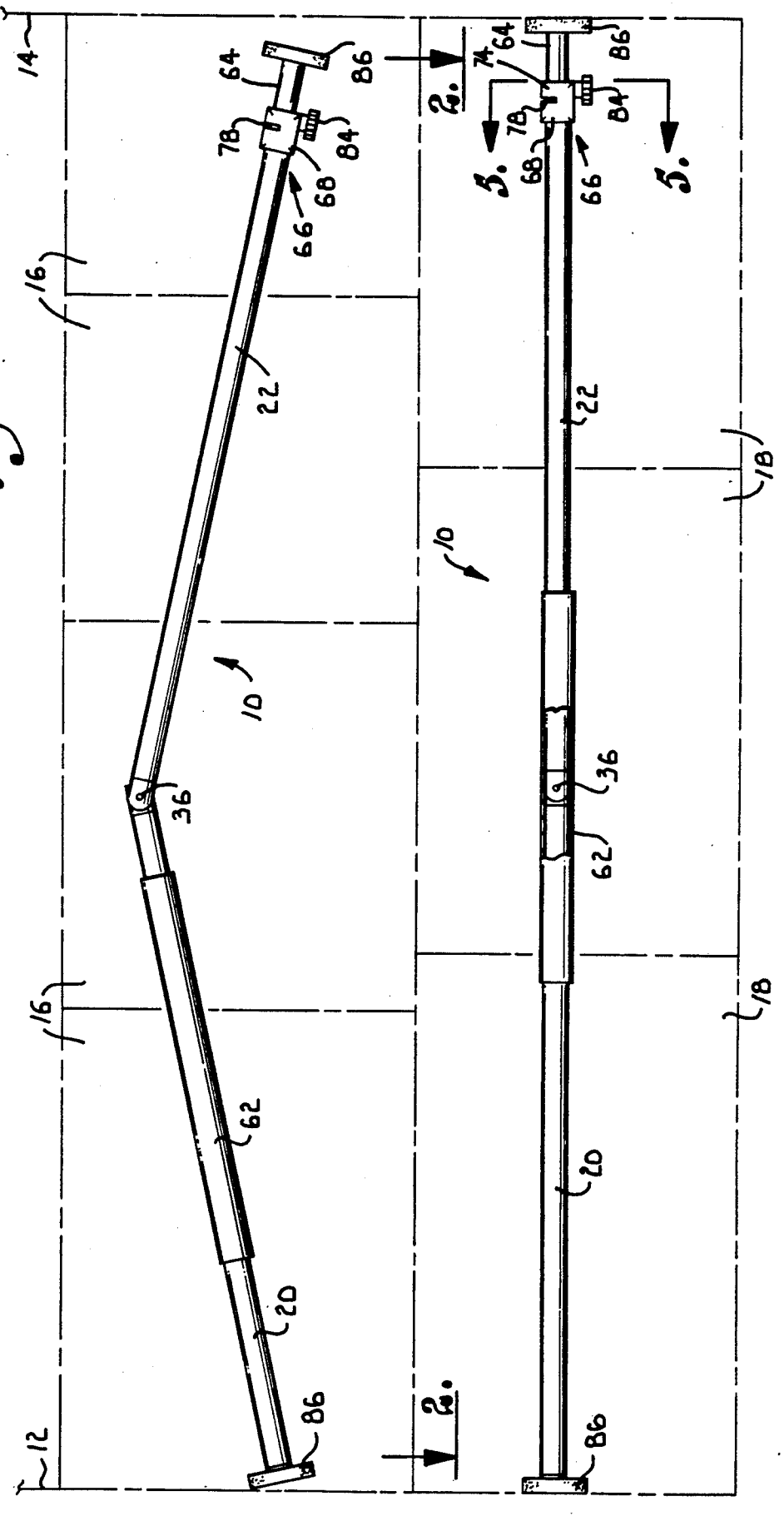

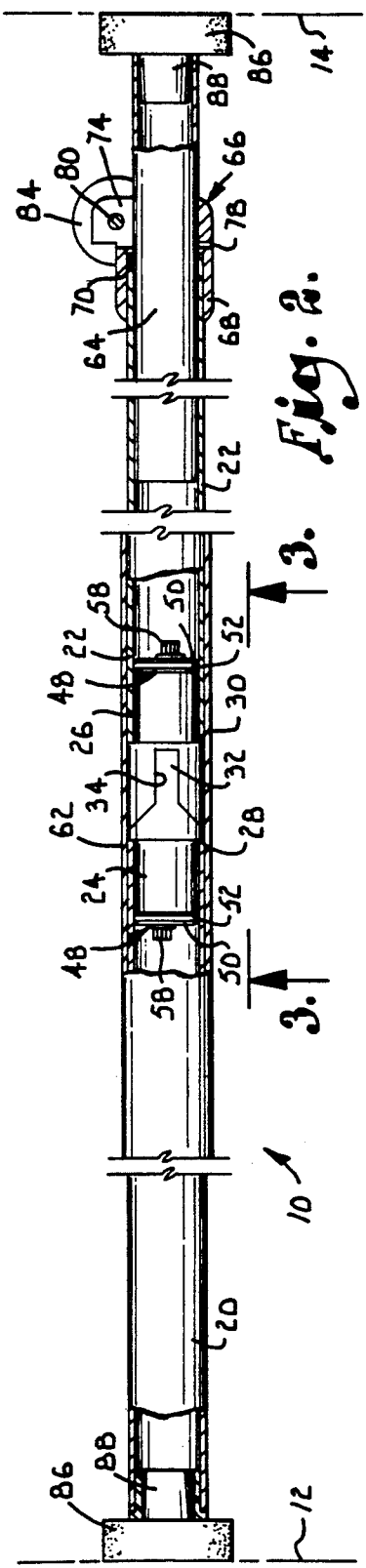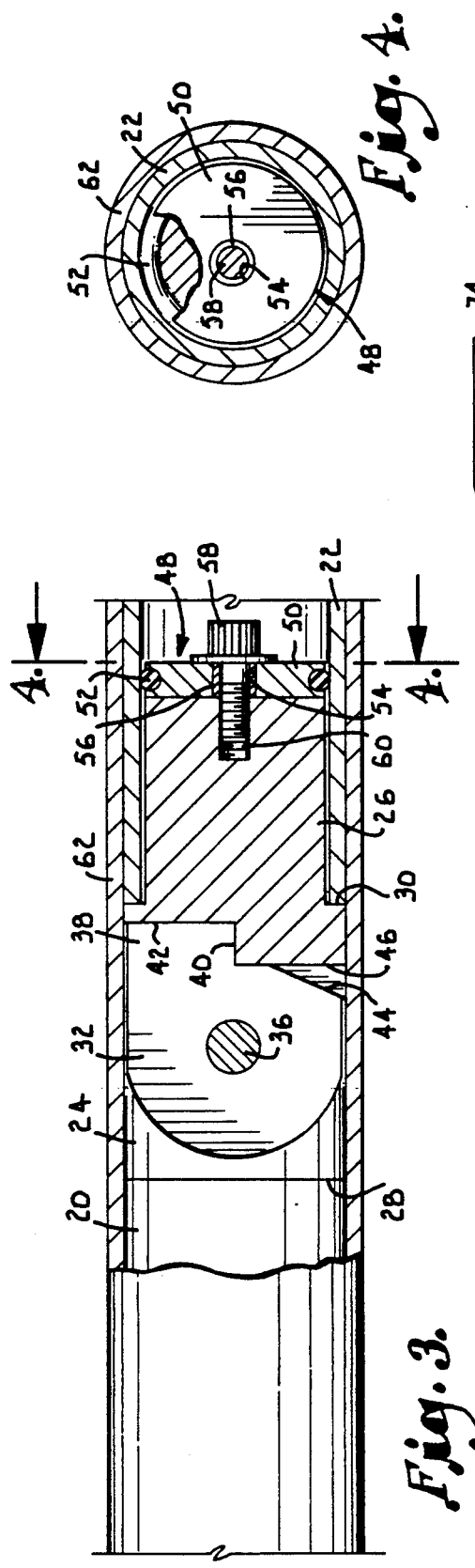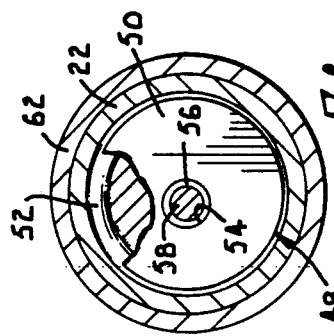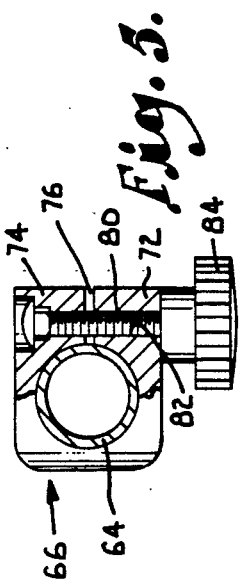

LOAD RESTRAINT BAR FOR CARGO VEHICLES

BACKGROUND OF THE INVENTION

This invention relates generally to the restraint of cargo and more particularly to an improved load bar which acts to restrain cargo against undue shifting in cargo vehicles such as over-the-road trailers.

Load restraints of various types have long been used to hold cargo in place within trucks and other cargo vehicles. For example, if the cargo compartment of the vehicle is not completely full, it is necessary to provide a load barrier to prevent the cargo from moving into the vacant area of the cargo compartment. The upper tiers of stacked cargo items such as crates, boxes or other containers are susceptible to falling if not restrained. Cargo restraints are also used to separate the cargo in one area from the cargo that is carried in other areas of the cargo compartment.

The load bars that have been used in the past for this purpose often require tracks or slots on the vehicle walls which mate with the ends of the cargo bar. The need for tracks and other hardware adds to the costs and creates limitations in the positioning of the restraint bar because the bar can be located only where it aligns with the slots or other openings in the track.

Other types of bars are equipped with padded feet on the opposite bar ends in order to eliminate the need for tracks or other hardware. The end padded bars must be expanded tightly between the opposite walls in order to be secured in place with enough holding power to withstand the considerable forces that can be applied to them by the cargo. Spring loaded bars and jack type bars with ratchet mechanisms or screw mechanisms have been proposed for axially expanding the bars to provide enough holding power to secure them in place between the cargo compartment walls. All such mechanisms are subject to considerable mechanical wear and also to contamination of the expansion mechanism by rust, dirt and other foreign materials which can impair the ability of the mechanism to function effectively. In addition, the length adjustment of existing load bars is somewhat limited, and considerable time and effort are involved in adjusting the length because the ratchet mechanism must be operated over and over and the screw mechanism requires numerous turns before substantial length adjustment is effected. Many bars require separate locks that must be operated to lock the mechanism and to unlock it when the bar is to be removed.

SUMMARY OF THE INVENTION

The present invention is directed to an improved cargo restraint bar which is constructed in a manner to overcome the problems that have plagued the bars used in the past. More specifically, it is an important object of the invention to provide a cargo restraint bar which can be extended between opposing walls in a cargo vehicle and held securely in place by compressive forces applied by the bar to the vehicle walls. This is achieved by providing a toggle joint between the two main tubes of the load bar. When straightened out, the toggle joint holds the two tubes in a straight and rigid condition with the tubes tightly compressed to furnish enough holding power against the walls to withstand the forces to which the bar is subjected in normal service. A further advantage of the toggle joint is that it can be quickly and easily collapsed to allow removal of the load bar.

Another important object of the invention is to provide a cargo restraint bar that is adjustable over a wide range of lengths. Accordingly, the bar can be used both in wide and narrow cargo compartments, and there is no need to provide different bars for different widths.

A further object of the invention is to provide a restraint bar of the character described in which the length adjustment can be quickly and easily carried out. In this regard, the telescoping extension tube is important because it allows the overall length of the bar to be adjusted simply by releasing the clamp and sliding the extension in or out before tightening the clamp again. Consequently, there is no need to repeatedly reciprocate a ratchet handle or to repeatedly turn a screw mechanism in order to carry out length adjustment of the load bar.

Still another object of the invention is to provide, in a load bar of the character described, a sleeve that may be slipped over the toggle joint to positively lock it in the straight condition so that it cannot inadvertently collapse. It is also advantageous that the sleeve can be quickly and easily slid off of the toggle joint when the load bar is to be removed.

An additional object of the invention is to provide, in a load bar of the character described, a stop arrangement for limiting the extent to which the toggle joint can be collapsed.

A still further object of the invention is to provide a load bar of the character described in which the tubes may be quickly and easily disassembled and stored in a compact condition when not in use.

Yet another object of the invention is to provide a load bar of the character described which is constructed in a simple and economical manner and which requires no tracks or other hardware on the vehicle walls. In the latter respect, the opposite ends of the bar carry pads which frictionally grip the vehicle walls to prevent slippage of the bar while avoiding scratches or other damage to the walls.

Other and further objects of the invention, together with the features of novelty appurtenant thereto, will appear in the course of the following description.

DESCRIPTION OF THE DRAWINGS

In the accompanying drawings which form a part of the specification and are to be read in conjunction therewith and in which like reference numerals are used to indicate like parts in the various views:

FIG. 1 is a rear elevational view showing a pair of cargo bars constructed according to the present invention in a cargo compartment, with the upper cargo bar collapsed and the lower cargo bar rigidly secured in place between the opposite cargo compartment walls to restrain the cargo, a portion of the lower bar being broken away for purposes of illustration;

FIG. 2 is a top plan view on an enlarged scale taken generally along line 2—2 of FIG. 1 in the direction of the arrows, with portions broken away and shown in section for illustrative purposes and with the break lines indicated continuous length;

FIG. 3 is a fragmentary elevational view on an enlarged scale taken generally along line 3—3 of FIG. 2 in the direction of the arrows, with portions shown in section for illustrative purposes;

FIG. 4 is a fragmentary sectional view taken generally along line 4—4 of FIG. 3 in the direction of the arrows, with a portion broken away for illustrative purposes; and FIG. 5 is a sectional view on an enlarged scale taken generally along line 5—5 of FIG. 2 in the direction of the arrows, with portions broken away for illustrative purposes.

DETAILED DESCRIPTION OF THE INVENTION

Referring now to the drawings in more detail and initially to FIG. 1, numeral 10 generally designates a cargo restraint bar which is constructed in accordance with the present invention and which is used in a vehicle cargo compartment bounded by opposite side walls 12 and 14. The cargo compartment may hold cargo such as shipping containers which are stacked such that an upper tier of containers 16 is stacked on top of lower tier of containers 18. Normally, one of the restraint bars 10 will be provided for each of the tiers of containers.

The cargo restraint bar 10 includes a pair of elongated tubes 20 and 22 which may be approximately the same length. Each tube 20 and 22 is cylindrical and is constructed of a rigid material, preferably aluminum or some other lightweight substance which exhibits the necessary strength.

The inner ends of the tubes 20 and 22 are pivotally connected by a toggle joint which is best illustrated in FIGS. 2 and 3. The toggle structure includes a pair of cylindrical plugs 24 and 26 which are fitted closely in the inner ends of the respective tubes 20 and 22. An annular shoulder 28 forms an abutment on plug 24 against which the inner end of tube 20 is butted in order to prevent plug 24 from moving toward the outer end of tube 20 from the position shown in FIG. 2. Similarly, plug 26 is provided with an annular shoulder 30 against which the inner end of tube 22 is butted to prevent plug 26 from moving toward the outer end of tube 22 from the position shown in FIG. 2.

Plug 24 is provided with projecting lug 32 which is closely received in a slot 34 formed in the other plug 26. The lug 32 and slot 34 are located between the inner ends of the two tubes 20 and 22. A pivot pin 36 is extended through the lug 32 and through the projecting portions of plug 26 located on opposite sides of the slot 34 in order to connect the two plugs 24 and 26 for pivotal movement about the axis of the pivot pin 36.

The tubes 20 and 22 are connected by the toggle structure for pivotal movement relative to one another between the straight, rigid position shown for the lower bar 10 in FIG. 1 and the collapsed position shown for the upper bar 10 in FIG. 1. Referring again to FIG. 3 in particular, the lug 32 has a projecting nose portion 38 which, in the straight position of the toggle structure, flatly contacts both a shoulder 40 and a wall surface 42 formed on plug 26. The contact between the nose 38 and surfaces 40 and 42 prevents the toggle joint from pivoting beyond the straight position of the cargo bar. Lug 44 has on its lower portion an inclined surface 44 which, in the collapsed position of the toggle structure, flatly contacts an adjacent wall surface 46 formed on plug 26. Contact between surfaces 44 and 46 prevents the toggle structure from pivoting beyond the collapsed position shown for the upper bar in FIG. 1. In this manner, the toggle structure restrains relative pivotal movement of the tubes 20 and 22 to the range between the straight position shown for the lower cargo bar 10 in FIG. 1 and the collapsed position shown for the upper bar in FIG. 1. In the straight position, the two tubes 20 and 22 are axially aligned, while the tubes are out of axial alignment in the collapsed position.

Each of the plugs 24 and 26 is provided with a cam mechanism which is generally identified by reference numeral 48 and which is the same for each plug. As shown in FIGS. 3 and 4, each of the cam mechanisms 48 includes a circular disk 50 which acts as a cam member and which has a peripheral groove that receives an o-ring 52. Each disk 50 is provided with a passage 54 which is displaced from the center of the disk and which receives a bushing 56. A screw 58 is extended through each bushing 56 and is threaded into the corresponding plug. Thus, when the screw 58 is tightened, the eccentrically mounted disk 50 is secured in place. Screw 58 can be loosened to permit rotation of the disk 50, thus permitting the disk to act as a cam that can be turned to adjust its rotative position. The o-ring 52 is compressed against the inside surface of the corresponding tube 20 or 22, and the o-ring serves to frictionally grip the tube in order to frictionally retain the plug in place in the tube while permitting the plug to be removed if desired. The threaded passage 60 which receives screw 58 is displaced from the radial center of the plug, thus allowing the disk 50 to serve as a cam when it is rotated in order to additionally compress the o-ring 52 or relieve the compression, depending upon the direction of rotation.

A tubular sleeve 62 is fitted around the bar 10 and may be slid along the tubes 20 and 22. Sleeve 62 fits closely on tubes 20 and 22 and, when the toggle joint is straightened out, the sleeve 62 may be slid such that it is centered on and covers the toggle joint, as shown for the lower bar in FIG. 1. Then, the sleeve 62 locks the toggle joint in its straight condition and prevents the toggle joint from inadvertently collapsing. The sleeve 62 may be slid off of the toggle joint onto either of the tubes 20 and 22, and the toggle joint can then be collapsed without interference from the sleeve.

An extension tube 64 is received in the outer end portion of tube 22 in a telescopic fit therewith. Tube 64 is smaller in diameter than tube 22 and may be telescopically extended and retracted by sliding it in or out.

A clamp which is generally identified by numeral 66 is used to lock the extension tube 64 in place relative to tube 22. The clamp 66 has a cylindrical clamp body 68 which is fitted closely on the outer end of tube 22. An annular shoulder 70 (FIG. 2) is formed internally of the clamp body 68 and butts against the outer end of tube 22 in order to prevent the clamp body 70 from moving inwardly along tube 22. A split clamp block which includes a pair of clamp sections 72 and 74 (see FIG. 5) is connected with the clamp body 68. Section 72 and 74 which are separated from one another on one side of tube 64 by a split 76. Block section 72 is connected directly with the clamp body 68, while the other block section 74 is separated from the clamp body 68 by a split 78 (FIG. 2).

With particular reference to FIG. 5, the clamp 66 is tightened by means of a carriage bolt 80 which extends loosely through a passage 82 that extends through the clamp block sections 72 and 74 across the split 76. An enlarged handle or knob 84 is threaded onto the end of the carriage bolt 80 and engages the outside surface of block section 72. When handle 84 is turned in a direction threading it onto the bolt 80, block section 74 is pulled toward section 72 to close the split 76, thus rigidly clamping the block onto the extension tube 64 in order to prevent it from retracting into tube 22. When the knob 84 is threaded outwardly on bolt 80, the split 76 is able to open and the clamp is released so that the extension tube 64 can be telescopically extended and retracted as desired. The rim of knob 84 is knurled to facilitate gripping the knob.

The outer ends of tubes 20 and 64 are provided with relatively soft pads 86 which may be constructed of rubber or a similar substance that will not mar or otherwise significantly damage the cargo vehicle walls 12 and 14. Each pad 86 is provided with a projecting stub 88 which fits closely in a press fit within the outer end of the corresponding tube 20 or 64.

In use, the cargo bars 10 serve to restrain cargo such as the shipping boxes 16 and 18. Each bar 10 is initially extended between the opposite side walls 12 and 14 with the toggle joint in its straight condition and with the clamp 66 loosened such that the extension tube 74 can be extended until the two pads 86 are in contact with the opposite side walls 12 and 14. The clamp 66 can then be temporarily tightened, and the toggle joint is collapsed. Clamp 66 can then be loosened, and the extension bar 64 can be extended a slight additional distance before the clamp 66 is again tightened securely. The bar is then positioned across the cargo compartment at the desired location, and the toggle joint is straightened out by pushing downwardly on it with sufficient force to move it to the straight, rigid position of the cargo bar. After the toggle joint has been straightened out, the sleeve 62 is slipped over the toggle joint in order to lock the bar in its straight condition.

In this manner, the cargo bar 10 is secured in place between the opposite cargo compartment walls 12 and 14, and considerable compressive forces are applied by the bar against the walls due to the toggle joint construction. The pads 86 provide non-slip contact with the walls 12 and 14, while the clamp 66 is able to avoid slipping due to its secure clamping action and its contact with the extension tube 64 around substantially its entire circumference. The lower bar is preferably located approximately midway or slightly above midway along the height of the lower tier of boxes 18. The upper cargo bar is likewise located at or above the center of gravity of the boxes 16 in the upper tier.

Each cargo bar 10 can be removed by sliding sleeve 62 in either direction until the toggle joint is uncovered and then applying a force upwardly on the toggle joint to move it to the collapsed position. The clamp 66 can first be loosened if necessary.

The cargo bar can be disassembled for compact storage by removing one or both of the plugs 24 and 26 from its tube 20 or 22. This reduces the length by approximately one-half and permits convenient storage of the load bar when it is not being used. The extension tube 64 can be fully retracted into tube 22 and locked in the fully retracted position by clamp 66 when the cargo bar is to be stored.

It is a particular feature of the invention that the cargo bar 10 has a wide range of operating lengths. The length is limited by the length of the extension tube 64, and it is preferred that a significant length of the extension tube remain in tube 22 in order to prevent possible buckling or other structural instability. It has been found that the cargo bar 10 can have a range between 86 inches and 105 inches in effective length and that this permits it to be used successfully in the vast majority of cargo vehicles.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

What is claimed is:

1. A cargo restraint bar comprising:
   first and second elongate tubes each having an inner end and an outer end;
   means for establishing a toggle joint connecting the inner ends of the tubes for pivotal movement between a rigid position wherein the tubes are axially aligned and a collapsed position wherein the tube axes are misaligned, said toggle joint establishing means comprising a pair of substantially cylindrical plugs connected with one another by said toggle joint, said plugs being received in the inner ends of the first and second tubes and being removable therefrom;
   adjustable cam means on each said plug for applying a frictional force against the corresponding tube to hold the plug therein;
   an elongate extension member having inner and outer ends and a sliding connection with said first tube in a manner permitting the extension member to extend and retract relative to the outer end of said first tube, thereby varying the length between the inner end of said first tube and the outer end of said extension member;
   releasable clamp means for clamping said first tube and said extension member together; and
   wall engaging means on the outer end of said second tube and on the outer end of said extension member for engaging opposed walls of a cargo compartment in the rigid position of the tubes.

2. The restraint bar of claim 1, wherein said wall engaging means comprises a pad on the outer end of said second tube and a pad on the outer end of said extension member.

3. The restraint bar of claim 1, including a sleeve mounted on said first and second tubes for sliding movement thereon between a first position wherein the sleeve covers said toggle joint to preclude collapse thereof and a second position wherein the sleeve is displaced from the toggle joint to permit collapse thereof.

4. The restraint bar of claim 1, wherein said extension member is connected with said first tube for telescopic extension and retraction relative thereto.

5. The restraint bar of claim 1, wherein:
   said extension member comprises an extension tube; and
   said extension tube is fitted in said first tube for telescopic extension and retraction relative thereto.

6. The restraint bar of claim 5, wherein said clamp means comprises:
   a clamp having a clamp body fitted on said outer end of the first tube and a clamping section extending from the clamp body and fitting closely around said extension tube; and releaseable means for rigidly connecting said clamping section of the clamp with said extension tube.

7. The restraint bar of claim 6, including an abutment on said clamp body acting against said outer end of the first tube to prevent the clamp body from moving on the first tube toward said inner end thereof.

8. The restraint bar of claim 6, wherein:
said clamping section of the clamp comprises a split clamping block closely surrounding the extension tube and having a split therein; and
said releaseable means comprises a threaded fastener connected with said clamping block in a manner to close said split by threaded action to clamp said clamping block to the extension tube.

9. The restraint bar of claim 8, including a handle on said fastener manually operable to effect closing and opening of said split.

10. The restraint bar of claim 1, wherein said cam means comprises:
an eccentric cam mounted on each plug for rotational movement and having a periphery adjacent the corresponding tube;
a friction member on the periphery of each cam for applying a frictional gripping force to the corresponding tube; and
releaseable means for locking each cam against rotation.

11. The restraint bar of claim 1, including an abutment on each plug acting against the inner end of the corresponding tube to prevent the plug from moving on the tube toward the outer end thereof.

12. A cargo restraint bar comprising:
first and second elongate tubes each having an inner end and an outer end;
a toggle structure having a pair of plugs connected by a toggle joint having straight and collapsed positions, said plugs being received in the inner ends of said tubes to connect the tubes for pivotal movement at said toggle joint;
releaseable means for holding said plugs in the inner ends of the tubes;
an elongate extension member having inner and outer ends and a sliding connection with said first tube in a manner permitting the extension member to extend and retract relative to the outer end of said first tube, thereby varying the length between the inner end of said first tube and the outer end of said extension member;
releaseable clamp means for clamping said first tube and said extension member together; and
wall engaging means on the outer end of said second tube and on the outer end of said extension member for engaging opposed walls of a cargo compartment when the toggle joint is in the straight position to hold said first and second tubes in axial alignment in extension across the cargo compartment.

13. The restraint bar of claim 12, including mating stop surfaces on said toggle structure engagable to prevent pivotal movement thereof beyond the collapsed position.

14. The restraint bar of claim 12, wherein said releaseable means for holding said plugs in the inner ends of the tubes comprises adjustable cam means on each plug for applying a frictional force against the corresponding tube to hold the plug therein.

15. The restraint bar of claim 14, wherein said cam means comprises:
an eccentric cam mounted on each plug for rotational movement and having a periphery adjacent the corresponding tube;
a friction member on the periphery of each cam for applying a frictional gripping force to the corresponding tube; and
releaseable means for locking each cam against rotation.

16. The restraint bar of claim 12, including a sleeve mounted on said first and second tubes for sliding movement thereon between a first position wherein the sleeve covers said toggle joint to preclude collapse thereof and a second position wherein the sleeve is displaced from the toggle joint to permit collapse thereof.

* * * * *